United States Patent
Yang et al.

(10) Patent No.: US 7,848,887 B2
(45) Date of Patent: Dec. 7, 2010

(54) MAKING DIRECTIONAL MEASUREMENTS USING A ROTATING AND NON-ROTATING DRILLING APPARATUS

(75) Inventors: Jian Yang, Sugar Land, TX (US); Qiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/680,689

(22) Filed: Mar. 1, 2007

(65) Prior Publication Data

US 2008/0215244 A1 Sep. 4, 2008

Related U.S. Application Data

(63) Continuation-in-part of application No. 10/709,212, filed on Apr. 21, 2004, now Pat. No. 7,382,135.

(51) Int. Cl.
*G01V 1/40* (2006.01)
*G01V 3/00* (2006.01)

(52) U.S. Cl. .......................... 702/9; 324/338

(58) Field of Classification Search ............... 702/9–13, 702/1–2, 150–151, 154; 166/244.1, 247–248; 324/332–333, 338, 344, 347–348, 356–357; 73/152.01–152.03, 152.44–152.46
See application file for complete search history.

(56) References Cited

U.S. PATENT DOCUMENTS 4,013,945 A * 3/1977 Grosso ................. 324/207.25

4,763,258 A * 8/1988 Engelder ................. 340/853.3

(Continued)

FOREIGN PATENT DOCUMENTS

RU 2069878 11/1996

(Continued)

OTHER PUBLICATIONS

VF Machetin, et al., "TEMP—a New Dual-Electromagnetic and Laterolog Apparatus-Technological Complex," 13th European Formation Evaluation Symposium Transactions, Budapest Chapter, SPWLA, Paper K (1990).

(Continued)

*Primary Examiner*—Michael P Nghiem
*Assistant Examiner*—Toan M Le
(74) *Attorney, Agent, or Firm*—Darla Fonseca; Charlotte Rutherford

(57) ABSTRACT

A system and method to determine directional measurements for a drilling tool that at times rotates and at other times does not rotate. The method includes making a first set of measurements when the apparatus is rotating, making a second set of measurements when the apparatus is not rotating, and combining the first and second sets of measurements to obtain the directional measurements. The system includes a transmitter-receiver pair wherein the transmitter has a magnetic dipole moment parallel to a longitudinal axis of the apparatus and the receiver has a magnetic dipole moment that is tilted relative to the longitudinal axis of the apparatus, an electronics module to excite the transmitter and detect a receiver signal to make a first and second set of measurements when the apparatus is rotating and not rotating, and a processor to combine the first and second sets of measurements to obtain the directional measurements.

6 Claims, 2 Drawing Sheets

U.S. PATENT DOCUMENTS

| | | | | |
|---|---|---|---|---|
| 5,017,778 | A * | 5/1991 | Wraight | 250/254 |
| 5,343,152 | A * | 8/1994 | Kuckes | 324/346 |
| 5,508,616 | A | 4/1996 | Sato et al. | |
| 5,812,068 | A * | 9/1998 | Wisler et al. | 340/855.5 |
| 6,181,138 | B1 * | 1/2001 | Hagiwara et al. | 324/338 |
| 6,272,434 | B1 * | 8/2001 | Wisler et al. | 702/9 |
| 6,476,609 | B1 * | 11/2002 | Bittar | 324/338 |
| 7,202,670 | B2 * | 4/2007 | Omeragic et al. | 324/338 |
| 7,382,135 | B2 | 6/2008 | Li et al. | |
| 2004/0183538 | A1 | 9/2004 | Hanstein et al. | |
| 2005/0083063 | A1 * | 4/2005 | Omeragic et al. | 324/338 |
| 2005/0140373 | A1 * | 6/2005 | Li et al. | 324/338 |
| 2006/0253255 | A1 * | 11/2006 | Omeragic et al. | 702/9 |

FOREIGN PATENT DOCUMENTS

| | | |
|---|---|---|
| RU | 2107313 | 3/1998 |
| SU | 960701 | 4/1981 |
| WO | 2008033967 | 3/2008 |

OTHER PUBLICATIONS

VA Korolev et al., "Electromagnetic Logging by a Lateral Magnetic Dipole. Perspectives of Electromagnetic Well Scanning," Geofizika Scientific-Production Company, Russia (1995).

"Double Electromagnetic and Lateral Logging," Methodical Handbook, Moscow, Nedra, Russian (1991).

* cited by examiner

MAKING DIRECTIONAL MEASUREMENTS USING A ROTATING AND NON-ROTATING DRILLING APPARATUS

CROSS-REFERENCE TO RELATED APPLICATIONS

The present application claims benefit as a continuation-in-part to U.S. patent application Ser. No. 10/709,212 (now U.S. Pat. No. 7,382,135), entitled "Directional Electromagnetic Wave Resistivity Apparatus and Method," filed on Apr. 21, 2004 by Qiming Li, et al.

TECHNICAL FIELD

The present invention relates to oil well development. More specifically, the present invention relates to a system and a method of determining directional measurements for a drilling apparatus when that apparatus is not rotating.

BACKGROUND OF THE INVENTION

In the field of oil well development, directional measurements are made to determine, for example, the distance between formation boundaries and a drilling apparatus, orientation of the formation boundaries with respect to the drilling apparatus, and to facilitate proactive well placement and formation evaluation. Directional measurements are often made from information gathered by electromagnetic LWD (Logging While Drilling) tools, which may employ antennas, disposed in the drilling apparatus. These tools operate over time and at different frequencies to provide multi-spacing and multi-frequency measurements. The received signals depend on a number of variables, including the transmitter-to-receiver spacing, frequency, azimuthal angle of the receiver(s), and the orientation angle of the formation relative to the receivers.

When the drilling apparatus, and thus the tools disposed in the drilling string, is rotating, the measured signal for an axial transmitter and tilted receiver is expressed as: $V = a_0 + a_1 \cos(\phi - \varphi)$, where V is received voltage, $a_0$ is a zeroth harmonic coefficient, $a_1$ is a first harmonic coefficient, $\phi$ is an azimuth angle of said receiver, and $\varphi$ is an orientation angle of a formation relative to the receiver. The orientation angle $\varphi$ is, for a given location of the receiver, the angle between the normal to the formation and a reference line in a plane perpendicular to the tool axis. A ratio of first and zeroth harmonic coefficients can be used to estimate the distance between the logging tool and the bed boundary. This is the basis of directional measurement. The signals measured at different receiver azimuthal angles are used in a fitting algorithm, as known in the art, to determine the zeroth and first harmonic coefficients and the orientation angle of the formation. This is possible as multiple measurements made during rotation provide sufficient data to apply the fitting algorithm. However, when the drill string is not rotating, the measurements are insufficient to use the fitting algorithm. According to the known art, in such case the coefficients and orientation angle of the formation, and therefore the directional measurements, cannot be determined. As a result, directional measurements can only be made when the drilling apparatus is rotating.

According to the known art, information obtained from directional measurements is used to steer a drilling apparatus. For instance, directional measurements are used to guide a rotary steerable system since that system rotates continuously. As such, directional measurements can be continuously made throughout the drilling process. However, when mud motors or similar mechanisms are used to drill the well, the direction of the drilling apparatus is changed by pushing or sliding the apparatus in a different direction. In this case, other than the drill bit, the drill string does not rotate as it is used in a new direction. Therefore, directional measurements cannot be taken during this time. Desirably, one would be able to determine coefficients used to construct directional measurements even when the drilling apparatus is not rotating.

There are known methods for obtaining directional measurements while the drilling apparatus is not rotating. Such methods involve making what are commonly referred to as tri-axial measurements. However, the employment of tri-axial measurements is burdensome, particularly in view of the present invention. For instance, making tri-axial measurements requires that additional sensors be placed on the drilling apparatus; also, the sensors must be synchronized with one another to obtain sufficiently accurate measurements. As such, the employment of tri-axial measurements increases the complexity of the machinery and requires additional steps for obtaining directional measurements.

In view of the above, a need exists for determining the coefficients necessary to construct directional measurements in an efficient and computationally straightforward manner, even when the drilling is not rotating.

SUMMARY OF THE INVENTION

According to particular embodiments, a system and method to determine directional measurements for a drilling tool that at times rotates and at other times does not rotate. The method comprises making a first set of measurements when the apparatus is rotating, making a second set of measurements when the apparatus is not rotating, and combining the first and second sets of measurements to obtain the directional measurements. The system comprises a transmitter-receiver pair wherein the transmitter has a magnetic dipole moment parallel to a longitudinal axis of the apparatus and the receiver has a magnetic dipole moment that is titled relative to the longitudinal axis of the apparatus, an electronics module to excite the transmitter and detect a receiver signal to make a first set of measurements when the apparatus is rotating and a second set of measurements when the apparatus is not rotating, and a processor to combine the first and second sets of measurements to obtain the directional measurements.

BRIEF DESCRIPTION OF THE DRAWINGS

For a more complete understanding of the present invention, reference is now made to the following descriptions taken in conjunction with the accompanying drawing.

DETAILED DESCRIPTION

Embodiments according to the present invention provide a system and method for making directional measurements.

Figure 1:
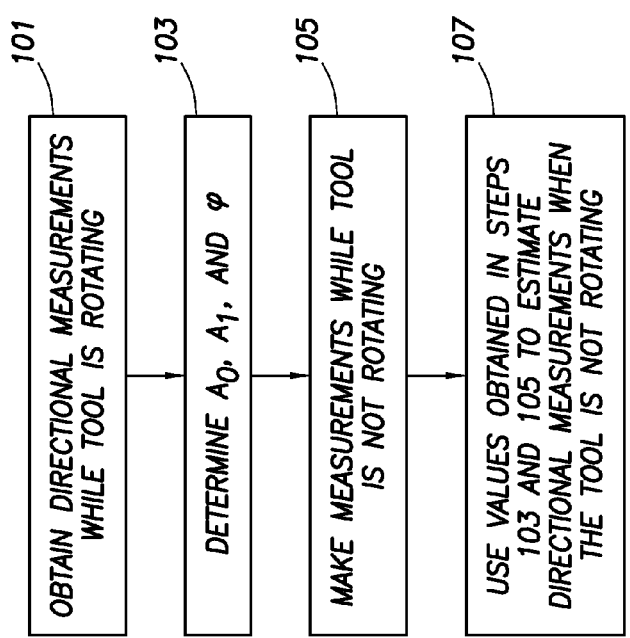
FIG. 1 is a flow chart of operation according to an embodiment of the present invention.

This is done by using some of the parameters obtained when the tool is rotating along with the measurements obtained when the tool is not rotating. Referring to FIG. 1, steps according to a preferred embodiment are shown. At step 101, directional measurements are made for a rotating drilling apparatus according to methods known in the art. At step 103 the data is used to obtain the zeroth harmonic coefficient, the first harmonic coefficient, and the orientation parameters. At step 105 measurements are made when the tool is not rotating. In particular embodiments, some values obtained in step 103 are used along with the data obtained in step 105 to estimate directional measurements when the tool is not rotating.

As mentioned, a preferred embodiment uses parameters obtained when the tool is rotating to complement the measurements made when the tool is not rotating. However, these parameters may be obtained at any time; that is, before, after, or during rotation of the drilling apparatus. Further, particular embodiments make directional measurements for a non-rotating drilling apparatus irrespective of whether the rotation period comes before or after the non-rotation period. For example, directional measurements for the apparatus when sliding may be obtained using parameters obtained later in time from a rotating apparatus.

Figure 2:
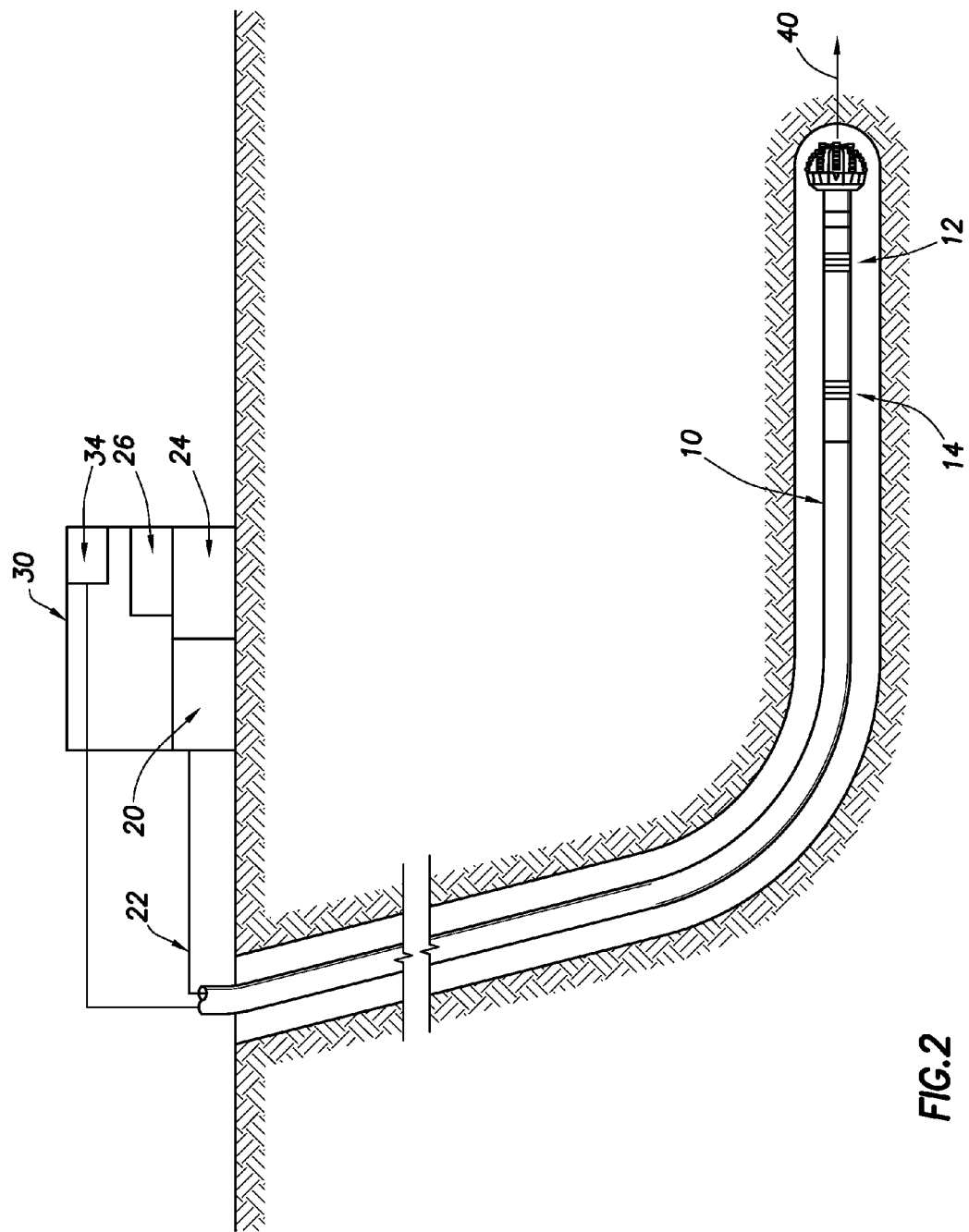
FIG. 2 is a schematic diagram of an embodiment of a directional drilling measurement apparatus constructed in accordance with the present invention.

Referring to FIG. 2, the process described above is implemented in a system in which drilling apparatus 10 is used to drill a well. According to FIG. 2, drilling apparatus 10 is shown at least partially below ground surface. Apparatus 10 can be almost any drilling apparatus as known in the art.

As shown in FIG. 2, processing station 30 has processor 20, storage means 24, user interface 26, and current source 34. Processing station 30 serves as a central location where information obtained by the downhole instruments may be received, logged, processed, and displayed to a user. The particular contents or configuration of processing station 30 is not crucial to the present invention. However, embodiments preferably comprise processor operable to perform operations as described herein. Embodiments are envisioned utilizing different configurations, and various arrangement of processing station 30 will be apparent to those skilled in the art. For example, particularly useful embodiments are envisioned where processor 20, storage 24, and current source 34 are positioned downhole, along apparatus 10, in proximity to receiver 12 and transmitter 14.

As shown, receiver 12 and transmitter 14 are each disposed along the length of apparatus 10. As will be further discussed, particular embodiments call for the signals received at receiver 12 from transmitter 14 to be expressed in terms of the azimuthal angle of receiver 12 and the angle of the formation relative to the receiver 12. In preferred embodiments, receiver 12 and transmitter 14 are loop antennas. For example, a transmitter antenna carries a current that produces a magnetic dipole moment that is orthogonal to the plane of the loop. Current may be supplied to transmitter 14 by any means known in the art. Receiver 12 and transmitter 14 are each transducers, which are disposed along apparatus 10. During operation, transmitter 14 converts current into electromagnetic energy that emanates into the surrounding formation, some portion of which returns to receiver 12.

Receiver 12 converts incident electromagnetic energy into electrical energy, which is expressed as a voltage signal. By measuring the signals at receiver 12 over a period of time, a wealth of information can be gathered about the strata and the formation itself. The signals at receiver 12 may be communicated to processor 20 by means known in the art. As shown in FIG. 2, process 20 may be positioned at the surface so that information is communicated between the receiver 12 and processor 20 by communication means 22. In FIG. 2, communication means 22 is shown as being conductive wires extending along apparatus 10 between the downhole transmitter-receive combination and processor 20, which is at the surface. However, other embodiments are envisioned in which communication means 22 is wireless. For example, signals may be communicated from the downhole instruments to a processing station 30 by telemetry methods, such as mud pulse telemetry. Also, other embodiments are envisioned where processor 20 is also positioned downhole, along apparatus 10.

To understand how directional measurements may be obtained when drilling apparatus 10 is not rotating, it is useful to first examine embodiments having a single receiver-transmitter pair, such as the embodiment disclosed in FIG. 2. In such case, the directional measurements (attenuation and phase-shift) can be expressed as:

$$ATT = -20\log_{10}\left(abs\left(\frac{1+\frac{a_1^{(1)}}{a_0^{(1)}}}{1-\frac{a_1^{(1)}}{a_0^{(1)}}}\right)\right) \quad (1)$$

$$PS = \text{angle}\left(1+\frac{a_1^{(1)}}{a_0^{(1)}}\right) - \text{angle}\left(1-\frac{a_1^{(1)}}{a_0^{(1)}}\right); \quad (2)$$

where $a_0$ is the zeroth harmonic coefficient, $a_1$ is the first harmonic coefficient of the measured voltage, and the function "angle" is defined as $\text{angle}(z) = \arctan(\text{imag}(z)/\text{real}(z))$ with real(z) and imag(z) representing the real part and imaginary part of a complex variable z. Again, it can be seen that $a_1/a_0$ must be known to determine the directional measurements.

Figure 3A:
FIG. 3A is a schematic diagram showing the magnetic dipole moments of the transmitter-receiver pair of the embodiment of FIG. 2.

Referring to FIGS. 2 and 3A, an exemplary embodiment is shown where there is only a single receiver-transmitter pair in drilling apparatus 10. The magnetic dipole moments of the transmitter and receiver are shown by their respective arrows. Note the magnetic dipole moment of receiver 12 should be neither parallel nor perpendicular to the longitudinal axis 40 of drilling apparatus 10, that is, receiver 12 should be "tilted". Moreover, the magnetic dipole moment of the transmitter is constrained to be parallel to longitudinal axis 40. Note, by reciprocity, the roles of the transmitter and receiver antennas may be reversed. The voltage signal at the receiver 12 can be expressed as:

$$V^{(1)} = a_0^{(1)} + a_1^{(1)}\cos(\phi^{(1)} - \phi^1); \quad (3)$$

as described in U.S. application publication No. 2005/0140373A1.

As seen, the voltage signal at the receiver 12 has two components: the zeroth harmonic coefficient and the first harmonic term. The zeroth harmonic coefficient remains constant as drilling apparatus 10 rotates; that is, the zeroth harmonic coefficient does not depend on the azimuthal angle of receiver 12. Also, the zeroth harmonic coefficient is not sensitive to the distance between apparatus 10 and the formation boundary. The first harmonic term, $a_1\cos(\phi-\phi)$, depends on the azimuthal angle of the receive 12; as such, it changes as drilling apparatus 10 rotates. Also, the first harmonic coefficient $a_1$ is sensitive to the distance between the receiver 12 and the formation boundary.

As drilling apparatus 10 rotates, measurements are preferably taken at various receiver orientations. In such case, sufficient information is provided by the measurements at multiple azimuthal angles to apply a fitting algorithm to obtain the coefficients $a_0$ and $a_1$. However, once drilling apparatus 10 stops rotating, measurements can only be taken at a single azimuthal angle (i.e., only a single value can be obtained for each receiver), and so the fitting algorithm cannot be applied. In such case, $a_0$ and $a_1$, which determine the directional measurements, cannot be obtained independently.

As mentioned, $a_0$ is not sensitive to the distance between the formation boundary and apparatus 10. As such, it can be safely assumed that $a_0$ has the same value whether drilling apparatus 10 is in rotting mode or in sliding mode. Also, in most cases the formation orientation does not change with respect to apparatus 10 as drilling apparatus 10 merely changes from rotating mode to sliding mode. As such $\phi$ has the same value whether drilling apparatus 10 is in rotating mode or is in sliding mode.

According to equation (3), measuring values for $a_0$ and $\phi$ during rotation, and using those same values when apparatus 10 is not rotating provides sufficient information to determine $a_1/a_0$. These values are then used in equations (1) and (2) to determine directional measurements in sliding mode.

According to this embodiment, determining the directional measurements for a single receiver-transmitter pair uses the values of:

1) $\phi = \phi^{rot}$
2) $a_0 = a_0^{rot}$
3) $a_1/a_0 = (V/a_0 - 1)/\cos(\phi - \phi)$ where $a_0^{rot}$ and $\phi^{rot}$ represent the respective values when drilling apparatus 10 is rotating.

Figure 3B:
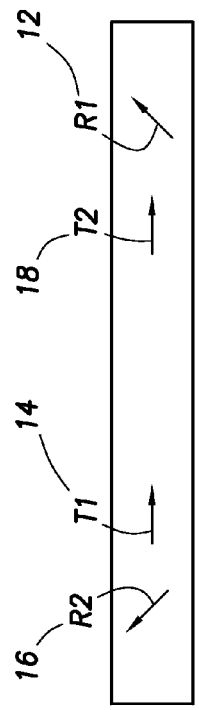
FIG. 3B is a schematic diagram showing the magnetic dipole moments of two transmitter-receiver pairs.
Figure 3C:
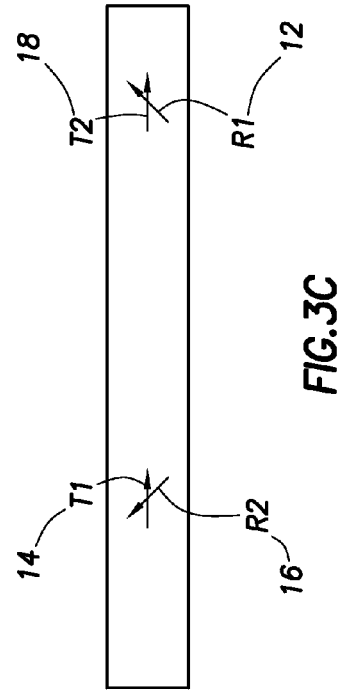
FIG. 3C is a schematic diagram showing the magnetic dipole moments of two co-located transmitter-receiver pairs.

Referring to FIG. 3B, a preferred embodiment is shown where a first receiver 12, a first transmitter 14, a second receiver 16, and a second transmitter 18 are disposed within apparatus 10. In this embodiment, the distance between first receiver 12 and first transmitter 14 is equal to the distance between second receiver 16 and second transmitter 18. As will be further discussed, having two receiver-transmitter pairs with the same distance between the receiver and transmitter, and operating with the same frequency, allows the signal to be combined to reduce sensitivity to anisotropy and dip angle of the formation. FIG. 3B shows each receiver and transmitter pair as being offset from one another. However, the pairs may be co-located within apparatus 10. That is, first transmitter 14 and second receiver 16 are disposed at the same location on apparatus 10, and second transmitter 18 and first receiver 12 are disposed at another location, as shown in FIG. 3C.

The signals at receivers 12 and 16 from transmitters 14 and 18, respectively, are expressed in terms of receiver azimuthal angle and the formation orientation angle as shown in equation (3). The orientation of receiver 12 and 16 and transmitters 14 and 18 may be defined in terms of angles with respect to axis 40 of apparatus 10. In one embodiment, the azimuthal angle of first receiver 12 is different than the azimuthal angle of second receiver 16; that is, the azimuthal angle between first receiver 12 and second receiver 16 is non-zero. The azimuthal offset between each receiver provides for distinct signals at each receiver.

The embodiments discussed herein, though the invention is not limited to such, facilitate determining symmetrized directional measurements at drilling apparatus 10, which are known to be insensitive to anisotropy and the relative dip of the formation. These symmetrized directional measurements, namely the symmetrized phase-shift and symmetrized attenuation measurements, can be expressed as:

$$PS = \text{angle}\left(1 + \frac{a_1^{(1)}}{a_0^{(1)}}\right) - \text{angle}\left(1 - \frac{a_1^{(1)}}{a_0^{(1)}}\right) + \text{angle}\left(1 + \frac{a_1^{(2)}}{a_0^{(2)}}\frac{\tan(\theta_R^{(1)})}{\tan(\theta_R^{(2)})}\right) - \text{angle}\left(1 - \frac{a_1^{(2)}}{a_0^{(2)}}\frac{\tan(\theta_R^{(1)})}{\tan(\theta_R^{(2)})}\right); \quad (4)$$

$$ATT = -20\log_{10}\left(\text{abs}\left(\frac{1 + \frac{a_1^{(1)}}{a_0^{(1)}}}{1 - \frac{a_1^{(1)}}{a_0^{(1)}}}\right)\right) - 20\log_{10}\left(\text{abs}\left(\frac{1 + \frac{a_1^{(2)}}{a_0^{(2)}}\frac{\tan(\theta_R^{(1)})}{\tan(\theta_R^{(2)})}}{1 - \frac{a_1^{(2)}}{a_0^{(2)}}\frac{\tan(\theta_R^{(1)})}{\tan(\theta_R^{(2)})}}\right)\right); \quad (5)$$

respectively, where $a_0^{(1)}$ is the "zeroth harmonic" at receiver 12, $a_1^{(1)}$ is the "first harmonic" at receiver 12, $\theta_R^{(1)}$ is the angle of receiver 12 with respect to the axis 40, $a_0^{(2)}$ is the zeroth harmonic at receiver 16, $a_1^{(2)}$ is the first harmonic at receiver 16, and $\theta_R^{(2)}$ is the angle of receiver 16 with respect to the axis 40. As seen from the expressions above, $a_1^{(1)}/a_0^{(1)}$ and $a_1^{(2)}/a_0^{(2)}$ must be known to determine the symmetrized directional measurements at receivers 12 and 16, respectively. Equations (4) and (5) are specific to embodiments having two receiver-transmitter pairs.

Referring again to FIGS. 3B and 3C, and generalizing equations (3) to embodiments having two receiver-transmitter pairs, shows that the voltage at receiver 12 from transmitter 14, denoted as $V^{(1)}$, and the voltage at receiver 16 from transmitter 18, denoted as $V^{(2)}$, can be expressed as:

$$V^{(1)} = a_0^{(1)} + a_1^{(1)}\cos(\phi^{(1)} - \varphi^{(1)}); \quad (6)$$

$$V^{(2)} = a_0^{(2)} + a_1^{(2)}\cos(\phi^{(2)} - \varphi^{(2)}); \quad (7)$$

where $\phi^{(1)}$ and $\phi^{(2)}$ are the azimuthal angles of receiver 12 and receiver 16, respectively, $\varphi^{(1)}$ and $\varphi^{(2)}$ are the orientation angles of the formation as seen by receiver 12 and receiver 16, respectively. In this case the values of $a_1^{(1)}/a_0^{(1)}$ and $a_1^{(2)}/a_0^{(2)}$ determine the symmetrized directional measurements, that is, phase-shift and attenuation.

In embodiments having two receiver-transmitter pairs, there are at least two techniques for determining the symmetrized directional measurements when apparatus 10 is in sliding mode. A fist technique involves treating each receiver-transmitter pair independently. As shown above the values can be set to:

1) $\phi^{(1)} = \phi^{(1)rot}$
2) $a_0^{(1)} = (a_0^{(1)})^{rot}$
3) $a_1^{(1)}/a_0^{(1)} = (V^{(1)}/a_0^{(1)} - 1)/\cos(\phi^{(1)} - \varphi^{(1)})$
4) $\phi^{(2)} = \phi^{(2)rot}$
5) $a_0^{(2)} = (a_0^{(2)})^{rot}$
6) $a_1^{(2)}/a_0^{(2)} = (V^{(2)}/a_0^{(2)} - 1)/\cos(\phi^{(2)} - \varphi^{(2)})$ where, again, the variables with superscript rot represent their respective values when drilling apparatus 10 is rotating. The values obtained for $a_1^{(1)}/a_0^{(1)}$ and $a_1^{(2)}/a_0^{(2)}$ can be used in equations (1) and (2) to determine directional measurements at receiver 12 and receiver 16, respectively, Alternatively, those rations can be used in equations (4) and (5) to determine the symmetrized directional measurements.

A second technique takes the ratio of the zeroth harmonic coefficients, as measured at each receiver, as constant between rotation at a time very near non-rotation mode. This assumption can be made because the electronic gains of both transmitter-receiver pairs are not expected to change during the brief transition from the rotation mode to the non-rotation mode. Further, the sum of the ratio of the fist and the zeroth harmonic coefficients at the first receiver and the ratio of the first and the zeroth harmonic coefficients at the second receiver, multiplied by a factor of $$\frac{\tan(\theta_R^{(1)})}{\tan(\theta_R^{(2)})}$$

remains constant. This is because the above-defined sum largely depends on the anisotropy and the dip angle, but not the distance to the formation boundary. According to this embodiment, we assign the following values:

$$\varphi^{(1)} = \varphi^{(1)rot} \quad (1)$$

$$\varphi^{(2)} = \varphi^{(2)rot} \quad (2)$$

$$d = a_0^{(2)}/a_0^{(1)} = (a_0^{(2)}/(a_0^{(1)})^{rot} \quad (3)$$

$$e = \frac{a_1^{(1)}}{a_0^{(2)}} + \frac{a_1^{(2)}}{a_0^{(2)}}\frac{\tan(\theta_R^{(1)})}{\tan(\theta_R^{(2)})} = \left(\frac{a_1^{(1)}}{a_0^{(1)}} + \frac{a_1^{(2)}}{a_0^{(2)}}\frac{\tan(\theta_R^{(1)})}{\tan(\theta_R^{(2)})}\right)^{rot} \quad (4)$$

$$\frac{a_1^{(1)}}{a_0^{(1)}} = \frac{\frac{V^{(1)}}{V^{(2)}}d\left\{e\cos(\phi^{(2)} - \varphi^{(2)}) + \frac{\tan(\theta_R^{(1)})}{\tan(\theta_R^{(2)})}\right\} - \frac{\tan(\theta_R^{(1)})}{\tan(\theta_R^{(2)})}}{\frac{V^{(1)}}{V^{(2)}}d\cos(\phi^{(2)} - \varphi^{(2)}) + \frac{\tan(\theta_R^{(1)})}{\tan(\theta_R^{(2)})}\cos(\phi^{(1)} - \varphi^{(1)})} \quad (5)$$

$$\frac{a_1^{(2)}}{a_0^{(2)}} = \left(e - \frac{a_1^{(1)}}{a_0^{(1)}}\right)\frac{\tan(\theta_R^{(2)})}{\tan(\theta_R^{(1)})}$$

Again, the variables with superscript rot represent the respective values when drilling apparatus 10 is rotating. The values for $\phi^{(1)}$, $\phi^{(2)}$, $d = a_0^{(2)}/a_0^{(1)}$, and $$e = \frac{a_1^{(1)}}{a_0^{(1)}} + \frac{a_1^{(2)}}{a_0^{(2)}}\frac{\tan(\theta_R^{(1)})}{\tan(\theta_R^{(2)})}$$

are treated as constants whether drilling apparatus 10 is rotating or not.

During operation, the orientation angles of the formation relative to receivers 12 and 16, ($\phi^{(1)}$ and $\phi^{(2)}$, respectively) will remain constant as long as the formation structure and the well trajectory along the azimuth direction do not change in the interval between the locations where apparatus 10 is rotating or sliding. In practice, because of the relatively short duration of the sliding, this is a good approximation. The values obtained for $a_1^{(1)}/a_0^{(1)}$ and $a_1^{(2)}/a_0^{(2)}$ can be used in equations (1) and (2) to determine directional measurements at receiver 12 and receiver 16, respectively. Those ratios can be used in equations (4) and (5) to determine the symmetrized directional measurements.

In addition to embodiments already discussed, alternative embodiments are envisioned where the magnetic moment of one or more receivers and/or transmitters is adjusted. In such case, the methods discussed here are still applicable without loss of generality.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods or steps.

What is claimed is:

1. A method to obtain directional measurements for a rotating and non-rotating drilling apparatus, the method comprising:
   making a first set of measurements when the apparatus is rotating using one or more transmitter-receiver pairs;
   making a second set of measurements when the apparatus is not rotating using one or more transmitter-receiver pairs;
   combining the first and second sets of measurements using a processing station to obtain the directional measurements while the apparatus is not rotating,
   wherein the combining comprises using the first set of measurements to compute at least a zeroth harmonic coefficient and an orientation angle.

2. The method of claim 1 wherein the combining further comprises:
   using the second set of measurements, the zeroth harmonic coefficient, and the orientation angle to compute a ratio of the first harmonic coefficient and the zeroth harmonic coefficient.

3. The method of claim 2 wherein the combining further comprises using the ratio of the first harmonic coefficient and the zeroth harmonic coefficient to compute a phase shift and an attenuation.

4. A method to obtain directional measurements for a rotating and non-rotating drilling apparatus, the method comprising:
   making a first set of measurements when the apparatus is rotating;
   making a second set of measurements when the apparatus is not rotating; and combining the first and second sets of measurements to obtain the directional measurements while the apparatus is not rotating, wherein
   the making the first set of measurements comprises using one or more transmitter-receiver pairs,
   the making the second set of measurements comprises one or more transmitter-receiver pairs; and
   for each transmitter-receiver pair, the combining uses the first and second sets of measurements from that transmitter-receiver pair to produce independent directional measurements,
   wherein the combining further comprises, for each transmitter-receiver pair,
   using the first set of measurements from that transmitter-receiver pairs to compute at least a zeroth harmonic coefficient and an orientation angle, wherein the zeroth harmonic coefficient and the orientation angle for that transmitter-receiver pair are constant whether the drilling apparatus is rotating or non-rotating.

5. The method of claim 4 wherein the combining further comprises:
   using the first set of measurements to compute at least a zeroth harmonic coefficient an orientation angle for each transmitter-receiver pair, wherein, whether the drilling apparatus is rotating or non-rotating, the orientation angle is constant for each transmitter-receiver pair, the ratios of the zeroth harmonic coefficients from different transmitter-receiver pairs are constant, and the sum of the scaled ratios of the first and zeroth harmonic coefficients for each transmitter-receiver pair is constant.

6. A method to obtain directional measurements for a rotating and non-rotating drilling apparatus, the method comprising:

making a first set of measurements when the apparatus is rotating;

making a second set of measurements when the apparatus is not rotating; and combining the first and second sets of measurements to obtain the directional measurements while the apparatus is not rotating, wherein:

the making the first set of measurements comprises using two or more transmitter-receiver pairs;

the making the second set of measurement comprises using two or more transmitter-receiver pairs;

the combining uses the first and second set of measurements from the two or more transmitter-receiver pairs simultaneously to produce the directional measurements; and the combining comprises:

using the first set of measurements to compute at least a zeroth harmonic coefficient and an orientation angle for each transmitter-receiver pair, wherein the zeroth harmonic coefficient and the orientation angle are constant for each transmitter-receiver pair whether the drilling apparatus is rotating or non-rotating.

* * * * *